Jan. 11, 1966   E. D. FISHER   3,228,633
BALLOON LAUNCHING DEVICE
Filed March 5, 1953   2 Sheets-Sheet 1
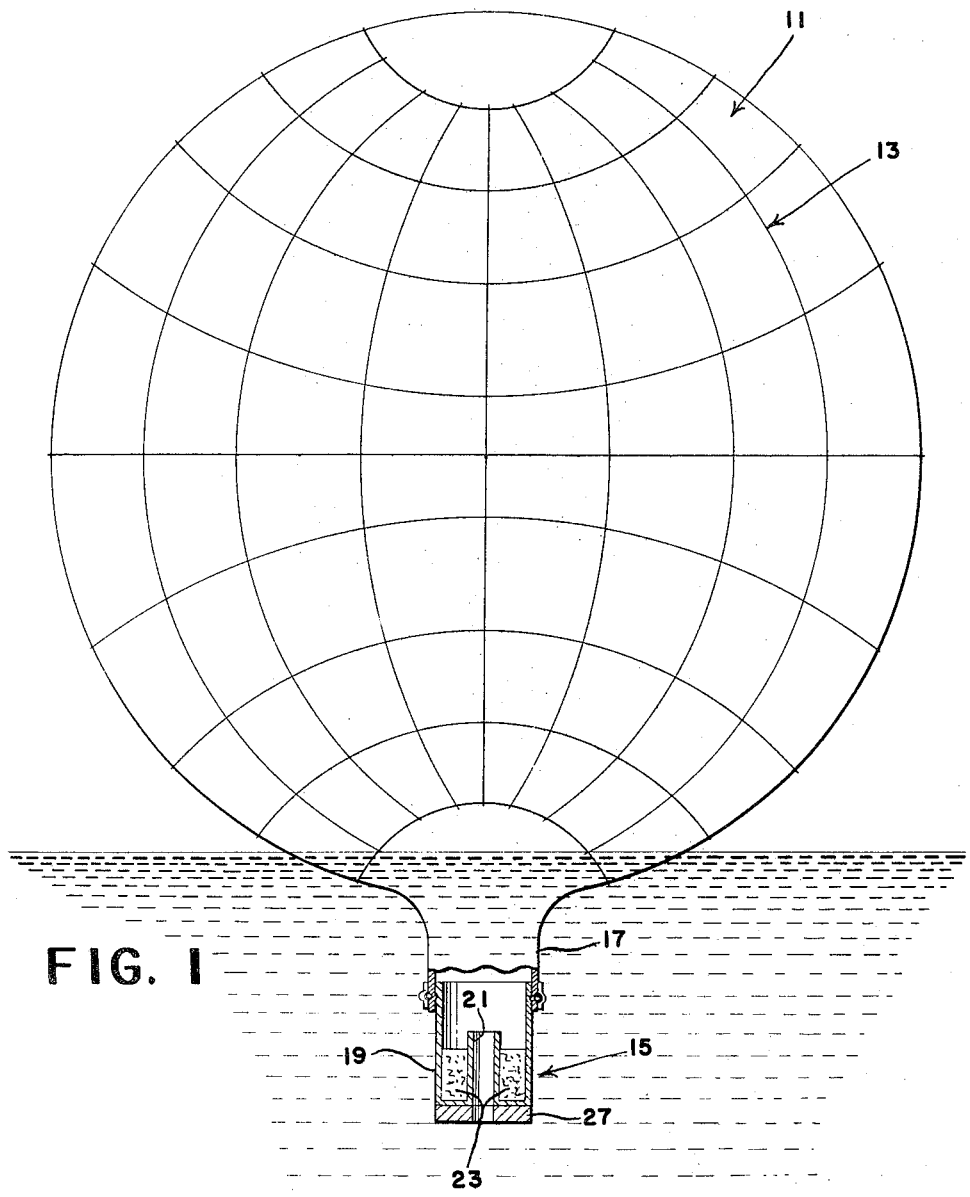
FIG. I
INVENTOR
EVAN D. FISHER
BY
ATTORNEYS Jan. 11, 1966     E. D. FISHER     3,228,633
BALLOON LAUNCHING DEVICE
Filed March 5, 1953     2 Sheets-Sheet 2
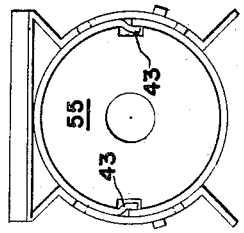
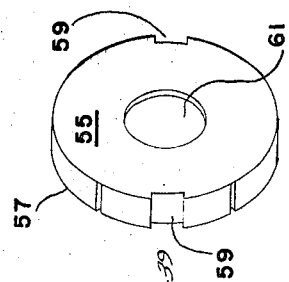
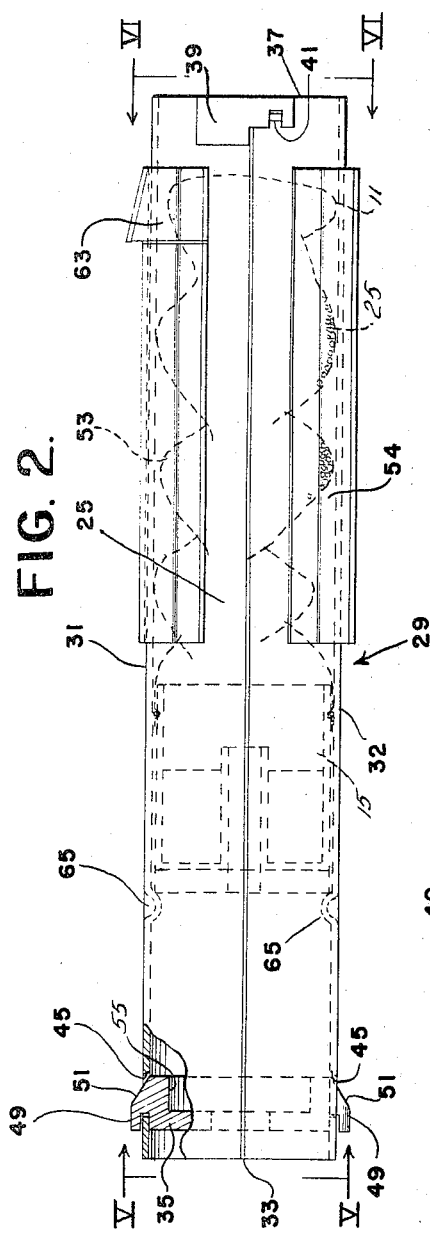
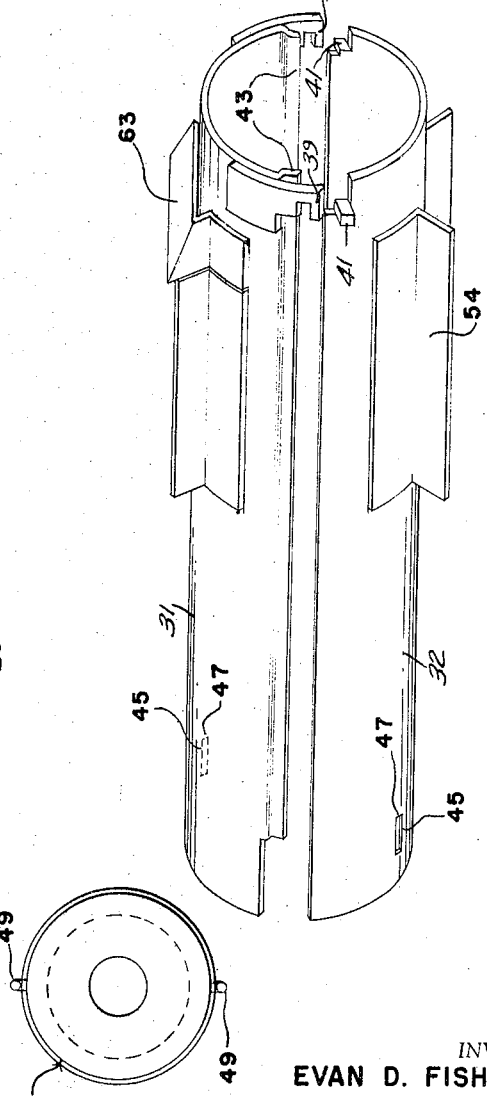
INVENTOR
EVAN D. FISHER
BY
ATTORNEYS

United States Patent Office 3,228,633
Patented Jan. 11, 1966

3,228,633
BALLOON LAUNCHING DEVICE
Evan D. Fisher, 9014 Spring Hill Lane, Chevy Chase, Md.
Filed Mar. 5, 1953, Ser. No. 340,648
9 Claims. (Cl. 244—98)
(Granted under Title 35, U.S. Code (1952), sec. 266)

The invention herein disclosed may be manufactured and used by or for the Government of the United States of America for governmental purposes without the payment of any royalties thereon or therefor.

The present invention relates to a radar decoy launching system, and more particularly to an automatic releasing and inflating system for use with surface radar decoys adapted to be launched from an aircraft.

With the increasing utilization of radar in modern warfare it is advantageous to provide countermeasures against enemy radar by expeditiously positioning radar decoys at predetermined locations on the surface of the ocean, and to launch such decoys from an aircraft. These decoys must give simulated signals to echo ranging equipment carried on enemy submarines and surface vessels, and be capable of being launched in a collapsed condition to facilitate rapid and numerous launchings from a speeding aircraft. Upon striking the surface of the water, the decoy must provide automatic inflation for a buoyancy device which maintains the radar decoy on the surface of the water for a reasonable operational period. A radar decoy to be effectively used as a countermeasure device must be compact in construction, automatic in operation, and expendable.

The present invention enables personnel aboard an aircraft to launch radar decoys quickly and efficiently by simply throwing overboard a small and light container which opens upon striking the water to automatically release and inflate the buoyancy device. Accordingly, the entire radar decoy launching system is packed in a container which occupies a small amount of space so as to enable an aircraft to carry a large number of these containers without jeopardizing space necessary for critical gear. The system is simple in construction in that moving parts are eliminated, thus preventing the possibility of functional failures due to the high impact loads when the container strikes the surface of the water. The container's contents consist of a unitary structure incorporating the buoyancy device and a reflecting material which gives reflections to radar equipment.

The container of the decoy system consists of separate pieces releasably assembled into a unitary structure by a cap member which is responsive to the impact arising when the container strikes the surface of the water. Upon impact, the cap releases the buoyancy device and the reflecting material which then enters the water in a collapsed condition. The buoyancy device is vented to the sea so that a water-activated chemical within the device automatically generates gas to inflate the buoyant member, hereinafter called a balloon. The balloon is connected to a chemical water pump which controls the amount of water vented into the balloon to maintain the balloon on the water surface. The balloon supports the reflecting material above the surface of the water where it is exposed to radar pulses, which reflecting material may comprise a wire mesh of such material as silver, aluminum, or the like.

An object of the present invention is the provision of a radar decoy launching system adapted to be launched from an aircraft.

Another object is to provide a balloon inflating system which operates automatically when striking the surface of the water.

A further object is to provide a launching system for a radar decoy which automatically releases a balloon and a radar decoy from a container when striking the surface of the water.

Still another object of the invention is the provision of a launching system for a radar decoy which automatically inflates a balloon immediately after being released from a container.

A final object of the present invention is the provision of a launching system for a radar decoy which maintains a balloon and a radar decoy on the surface of the water.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a front view, partly in section, of a preferred embodiment of the invention in operation;

FIGURE 2 is a side view, partially in section, of a container with the decoy of FIGURE 1 therein;

FIGURE 3 is a perspective view of a pair of semicircular shells comprising the container of FIGURE 2;

FIGURE 4 is a perspective view of an end block for the upper end of the container of FIGURE 2;

FIGURE 5 is an end view of a weight cap for the lower end of the container of FIGURE 2, taken on the line V—V of FIG. 2, looking in the direction of the arrows; and FIG. 6 is an end view of the apparatus taken on the line VI—VI of FIG. 2, looking in the direction of the arrows.

Referring now to the drawings, there is shown in FIG. 1 an impervious envelope or balloon 11, of any desired shape, such as spherical as herein illustrated, constructed of an impervious resilient material such as pure gum or the like which is adapted to be inflated by low pressures and to entrap a gas for extended periods of time. A reflecting material 13, such as silver, copper, aluminum, or the like, is mounted upon the outer spherical surface of the balloon 11 to reflect radar pulses. Securely attached to the balloon 11 is the chemical gas generator 15, for purposes later to be described.

The gas generator employed with the present invention may be of any desired type, the major requirements being that it be lightweight and provide an easily controlled emission of gas over a short period of time. The gas generator herein described in inexpensive to construct, rugged, and capable of producing a controlled flow of gas, although many other types of generators may also be employed if desired.

As best seen in FIG. 1, the gas generator 15 comprises an outer cup 19 and a water passage in the form of a vent tube 21 extending through the bottom of the cup to a predetermined point near the top of the cup. The cup is adapted to be sealed to the neck 17 of the balloon 11, and the volume between the inside of the cup 19 and the vent tube 21 is filled to within a predetermined distance from the top of the vent tube with a chemical 23 which liberates a gas upon contact with water. Suitable chemicals include lithium hydride, calcium hydride, lithium metal, and others. In the present disclosure and for the purposes of illustration, lithium hydride is employed, since it liberates approximately forty-five cubic feet of hydrogen at atmospheric pressure per pound of chemical and is capable of producing gas at any desired pressure, although other chemicals and gases are usable.

Lithium hydride crystals 25 are placed within the balloon 11 before it is sealed to the gas generator 15 in sufficient quantity to substantially inflate the balloon. Inflation is thereby insured, and excess gas may escape through the vent tube 21. The crystals 25 are not secured within the balloon in any way, and readily fall into water within the balloon as it is inflated.

The present decoy floats on the surface of the water at approximately the depth indicated in FIGURE 1. The decoy is launched in a collapsed condition and sinks into the water, so that water will enter the gas generator 15 through the open vent tube 21.

When water enters the gas generator 15, it immediately starts a reaction with the lithium hydride 23, thus liberating hydrogen which passes through the neck 17 into the balloon 11. The balloon 11 is partially inflated by this action, and the hydrogen moving through the neck reduces the pressure in the vent tube 21 to draw in more water.

As the balloon 11 is inflated, the lithium hydride crystals 25 packed within the balloon come into contact with the water drawn in through the vent tube 21 and further inflate the balloon. As the pressure in the balloon 11 increases, it, of course, expands, and at the same time, increases the pressure in the gas generator 15 to a point at which no further water may enter, until the water already in the generator is expended.

The pressure within the gas generator 15 which is required to prevent the entrance of water is determined by its depth in water, and its depth in the water is determined by the length of the neck 17. Since the pressure required to inflate a given balloon to a given volume may be readily determined, the required depth of the gas generator 15 may be easily determined.

As the gas in the balloon 11 leaks through the walls thereof the pressure in the gas generator 15 decreases to a point at which more water is admitted to the lithium hydride 23 to replenish the gas supply. The gas generator therefore operates at a substantially constant rate for an extended period of time. If the pressure in the balloon increases sufficiently to overcome the water pressure at the vent tube 21, it escapes through the water without injury to the apparatus. The system is thus protected from bursting and is automatic in operation.

The lithium hydride crystals 25 packed within the balloon 11 substantially inflate the balloon, and the gas generator 15 serves to open the balloon and to insure an adequate water supply for complete inflation. If the pressure within the balloon decreases, its volume decreases so that the gas generator sinks deeper into the water, where the increasing water pressure forces more water to the lithium hydride. The effect of pressure on the reaction of lithium hydride may be neglected, since it can release hydrogen at pressures of several thousand pounds per square inch.

If desired, weights may be added to the decoy to insure that the gas generator 15 will remain submerged when the balloon 11 is inflated. Such weight means is shown in FIGURE 1 as a weight disc 27 attached to the lower end of the gas generator.

The reflective material 13 is attached to the exterior of the balloon 11, and may comprise, as previously mentioned, any of a number of materials. For example, the balloon 11 may be spray-coated with metallic paint, covered with foil, or covered with conductive wire, such as a wire mesh of silver wire. The latter system is preferred because the mesh is flexible and not easily damaged in handling or launching. Furthermore, the quantity of silver required for a light mesh is slight.

In order to launch the radar decoy system from an aircraft, the entire apparatus is packed in a metal assembled casing 29, as shown in FIG. 2. The casing 29 comprises a pair of semi-cylindrical shells 31 and 32 which when assembled form a cylinder. At the lower end 33, the two semi-cylindrical shells are releasably secured by the weight cap 35 while at the upper end 37, they are releasably secured together by means of hook strips 39 attached to one shell and engaging the projections 41 on the other shell. The inside surfaces of the casing 29 are coated with an inactive substance, such as lacquer or the like, to prevent electrolytic action between the metal casing and the reflective material 13 which would destroy the usefulness of the decoy. Also, one of the shells is provided with diametrically recessed edges 43 which extend along a substantial portion of the length of the shell and serve as a guide means for the assembly of the casing 29.

The lower end of each of the shells 31 and 32 is provided with a longitudinal slot 45, with an upper slot-end 47, which engages over the supporting projections 49 on the cap 35, and are normally prevented from disengaging therefrom by gravity. However, when the cap 35 is forced upward by the force of impact of the device with the water, the shells are released and forced apart by the inclined surfaces 51 on the upper exteriors of the supporting projections 49. Movement of one shell relative to the other releases the hook strips 39 from the corresponding projections 41.

In order to insure that the casing 29 will strike the water in an upright position, stability means are attached to the upper end thereof and may take the form of a small parachute or fins attached to the exterior of the casing. Longitudinal fins 53 and 54 are illustrated herein because they are simple and inexpensive.

A resilient end plug 55 is inserted into the upper end 37 of the casing 29 to protect its contents in storage, handling and launching. The end plug is formed with resilient edges 57 adapted to bias the inside surface of the casing to maintain the end plug 55 in a fixed position relative to the upper end 37. Also, the end plug is provided with diametrically opposite cut-outs 59 to provide a recess therein for the recessed edges 43, and with a center aperture 61 to facilitate its insertion within the upper end 37. Attached to one shell is a drag plate 63 which is inclined forward and outwardly to produce a force which insures that the hook strips 39 disengage themselves when the device enters the water.

The diameter of the casing 29 is only slightly larger than the diameter of the gas generator which is prevented from shifting in the casing by the dimples or indentations 65 at its lower end. The balloon 11 and the reflecting material 13 are packed between the gas generator and the end plug 55.

In operation, the system is launched by hand from an aircraft and follows a substantially smooth trajectory because of the action of the stability fins 53 and 54 and the weight cap 35 in the nose end 33, this trajectory causing the casing 39 to strike the water nose first. Upon striking the surface of the water, the weight cap 35 is driven back so that each of the sloping surfaces 51 coacts with the respective slot-end 47, forcing the shells apart to cause the initial separation of the upper and lower shells. The drag plate 63 contacts the water immediately after the initial separation of the shells and produces a drag component in the upper shell 31 relative to the lower shell 32 to disengage the radially protruding pins 41 from the hook strips 39. Upon separation, the shells sink to the bottom while water enters the balloon 11 through the vent tube 21. The entering water coacts with the lithium hydride between the cup 19 and the vent tube to quickly liberate hydrogen gas which quickly rises and produces a pressure differential enabling the water to quickly flow into the balloon 11 where it coacts with the loose lithium hydride crystals 25, thus liberating gas to quickly inflate the balloon. As the balloon 11 is inflated it rises to the surface, thus placing the reflecting material 13 in an operative position.

For the purposes of illustration of one embodiment of the present invention, the system utilizes approximately 200 grams of 93% pure lithium hydride, which is acted upon by water for 30 seconds. The assembled finned casing 29 is constructed of aluminum alloy, while the weight cap 35 consists of die casted white metal. The reflecting material 13 is silver mesh, and the balloon 11 is of natural latex and will remain afloat for four or five days before the hydrogen gas leaks out through the balloon. In actual operation, the apparatus is launched by hand from an aircraft traveling at about 150 miles per hour at an approximate altitude of 500 feet, and hits the water surface at an angle of 70° to 80° from the horizontal.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A surface radar decoy system adapted to operate on the surface of a body of water comprising a balloon, a gas liberating chemical within said balloon, reflector means carried by said balloon to thereby operate as a radar decoy, a gas generator secured to a bottom portion of said balloon and having means therein arranged to pump water into said balloon to coact with said gas liberating chemical and thereby inflate said balloon, said pump means forming a constantly open passageway between the interior of the balloon and the body of water, and said balloon and said gas generator being so proportional, constructed and arranged that the generator holds the balloon on the surface of the body of water.

2. The invention as defined in claim 1 but further characterized in that said gas generator comprises gas liberating means, a water vent being the water inlet to said balloon and to said gas liberating means whereby the water activates said gas liberating means to cause a pressure drop at said water vent and cause more water to flow through said water vent to said balloon, and weights attached to said gas generator to maintain the same under water.

3. A surface radar decoy system adapted to be launched from an aircraft, comprising an assembled casing having a first shell and a second shell, a plurality of stability fins longitudinally secured to said casing, a drag plate secured to said first shell, a longitudinally movable weight cap releasably attached to the bottom of said casing, a plurality of indentations on said casing, releasable self-inflating buoyancy means within said casing and abutting said indentations, reflecting means attached to said buoyancy means to operate as the radar decoy, an end cap resiliently secured to the top end of said casing to maintain said buoyancy means within said casing, and means to releasably hold said first shell and said second shell together.

4. An assembled casing adapted to be dropped into the water from an aircraft, having a first semi-cylindrical shell and a second semi-cylindrical shell, an open bottom-end and an open top-end, a pair of diametrically opposed longitudinally slots adjacent said bottom end, a weight cap having a pair of diametrically opposite supporting members of a length less than the length of said longitudinal slots, said supporting members projecting through said longitudinal slots to support said weight cap therein and to prevent the separation of the first and second shells, each of said supporting members having an external sloping surface which coacts with the respective facing slot end so that when the weight cup is displaced longitudinally said first and second shells separate at said bottom-end, a pair of hook strips secured to said first shell adjacent said top-end, and a pair of radially protruding pins integral with said second shell adjacent said top-end which coact with said protruding pins to releasably couple said first and second shells together.

5. The invention as defined in claim 4 but further characterized by said casing having a plurality of stability fins of a predetermined length, and a drag plate secured to said first shell adjacent said top-end to coact with said hook strips to uncouple the same from said radially protruding pins when said drag plate strikes the water.

6. A radar decoy for simulating a surface object comprising a gas generator having outside walls and an open vent tube extending through the bottom thereof to form a container defined by the outside walls, the vent tube, and the bottom, a granular chemical which reacts with water to liberate a lighter-than-air gas within said container, an outlet on the top of said gas generator, an inflatable impervious balloon sealed to said outlet, said resilient impervious balloon containing granules of said chemical when deflated, and a metallic surface on said inflatable impervious balloon, whereby to inflate the balloon when the decoy is submerged in water.

7. The device as claimed in claim 6 but further characterized by a container surrounding said decoy comprising a pair of semi-cylindrical shells, directive fins attached to a first end of the least one of said shells, releasable hook means at said first end of said shells, detent means formed in said shell for securing said gas generator therebetween, and a weight cap releasable by impact securing the other end of said semi-cylindrical shells, whereby said decoy is released from the shells upon impact with the water upon launching.

8. A surface radar system adapted to operate on the surface of a body of water comprising a balloon, a gas liberating chemical within said balloon, reflector means carried by said balloon to thereby operate as a radar decoy, a gas generator attached to an open end of said balloon at the bottom thereof, said generator being weighted in a manner as to hold said balloon on the surface of said body of water with the generator submerged, said generator having means therein to pump water into said balloon to coact with said gas liberating chemical and thereby inflate said balloon, and said generator and pump means being formed with a continuously open passageway therethrough open at one end to the body of water and at the other end to the interior of the balloon, the construction and arrangement of said balloon, said gas generator and said pump being such as to control the depth of submersion of the generator which in turn controls the amount of water pumped into the balloon, the amount of gas generated and the pressure to which the balloon is inflated.

9. A radar decoy system adapted to be launched from an aircraft onto a body of water comprising, an assembled finned casing having a nose weight and an upper coupling means which serves to releasably secure said casing in an assembled status, self-inflating buoyancy means within said casing, and an impact responsive cap to releasably maintain said buoyancy means within the casing, said buoyancy means including a balloon, reflector means carried by said balloon to thereby operate as a radar decoy, a gas generator attached to an open end of the balloon in open communication therewith, said gas generator having a granular chemical therein which reacts with water to liberate a lighter-than-air gas for passage therefrom into said balloon, said generator being formed with a continuously open passageway therein open at one end to said body of water and at the other end to the interior of said balloon, and said buoyancy means including means incorporated therein for maintaining the radar decoy on the surface of the body of water upon release of the buoyancy means from the casing by impact with such body of water.

References Cited by the Examiner

UNITED STATES PATENTS

| | | | |
|---|---|---|---|
| 1,440,596 | 1/1923 | Hammond | 102—14 |
| 2,334,211 | 11/1943 | Miller | 102—7 X |
| 2,455,469 | 12/1948 | Caspar | 343—18 X |
| 2,470,783 | 5/1949 | Mead | 343—18 |
| 2,489,337 | 11/1949 | Sperling | 343—18 |
| 2,587,564 | 2/1952 | Williams | 244—13 |

MILTON BUCHLER, *Primary Examiner.*

SAMUEL BOYD, *Examiner.*

S. H. GOLDMAN, R. W. ERICKSON,
*Assistant Examiners.*